United States Patent [19]

Danna

[11] Patent Number: 5,221,021

[45] Date of Patent: Jun. 22, 1993

[54] FUEL TANK RESERVOIR

[75] Inventor: Anthony J. Danna, Farmington, Mich.

[73] Assignee: Ford Motor Company, Dearborn, Mich.

[21] Appl. No.: 807,365

[22] Filed: Dec. 16, 1991

[51] Int. Cl.⁵ .............................................. B65D 5/54
[52] U.S. Cl. .................................... 220/563; 220/564; 220/723
[58] Field of Search ............... 220/720, 721, 722, 723, 220/562, 563, 564

[56] References Cited

U.S. PATENT DOCUMENTS

| | | | |
|---|---|---|---|
| 2,430,905 | 11/1947 | Bradley | 220/720 |
| 3,426,937 | 2/1969 | Boschi et al. | |
| 3,534,884 | 10/1970 | Suter | |
| 3,648,886 | 3/1972 | Pringle | |
| 3,747,800 | 7/1973 | Vicand | 220/723 |
| 3,779,420 | 12/1973 | Knaus | 220/720 |
| 3,821,876 | 7/1974 | Glaspell | 220/720 |
| 3,887,104 | 6/1975 | Cole | |
| 4,136,802 | 1/1979 | Mascia et al. | 220/723 |
| 4,153,155 | 5/1979 | Benno | 220/720 |
| 4,213,545 | 7/1980 | Thompson et al. | 220/723 |
| 4,264,018 | 4/1981 | Warren | 220/723 |
| 4,411,441 | 10/1983 | Marcheix et al. | |
| 4,549,673 | 10/1985 | Kupersmit | |
| 4,625,980 | 12/1986 | Lyzohub | |
| 4,852,765 | 8/1989 | Lyzohub | |

*Primary Examiner*—Joseph Man-Fu Moy
*Attorney, Agent, or Firm*—Damian Porcari; Clifford L. Sadler

[57] ABSTRACT

A fuel tank assembly comprising first and second fuel tank walls comprising a reservoir therebetween. The reservoir has a resilient portion which biases the reservoir in place against the first and second fuel tank walls. The reservoir is held securely in position without the need for mechanical fasteners.

15 Claims, 3 Drawing Sheets

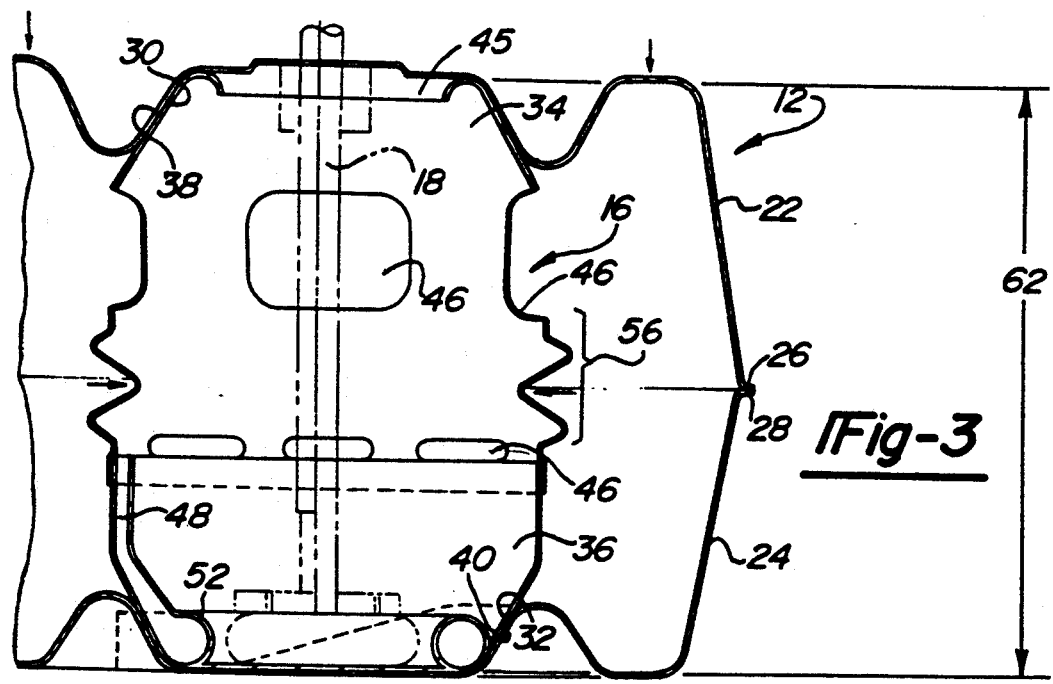
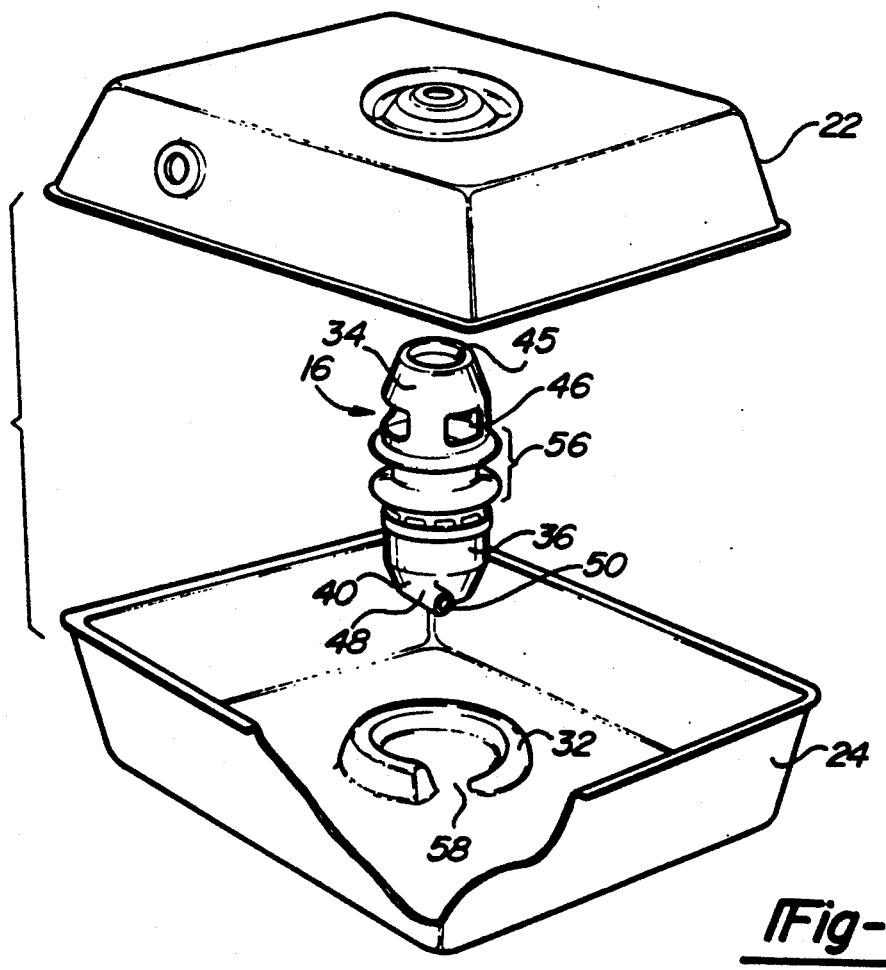

FUEL TANK RESERVOIR

FIELD OF THE INVENTION

The present invention generally relates to reservoirs for use in containers. More specifically, the invention relates to a reservoir which is retained in a fuel tank without use of mechanical fasteners.

BACKGROUND OF THE INVENTION

Conventional fuel tanks often contain either an integral or separate reservoir for concentrating fuel within the tank to be supplied to an engine. The reservoir acts to confine fuel for pick-up by an in-tank fuel pump or fuel pick-up tube while the vehicle is undergoing a change of direction or speed. Plastic fuel tanks may be integrally molded with the reservoir shape in the bottom wall of the fuel tank. Metal fuel tanks generally use add-on reservoirs because the metal tank wall cannot be formed in the shape of the reservoir. These add-on type reservoirs may be either made of plastic or metal and secured to the fuel tank through mechanical means. The most common securing method includes forming a leg on the reservoir which lies along the fuel tank bottom. A metal strap is placed atop the leg and secured to the fuel tank bottom by welding, soldering, or brazing. The reservoir is held in place by one or more straps. If the straps become loose, the reservoir may shift out of position or rattle.

Securing the strap to the fuel tank bottom involves an expensive, time-consuming procedure. The interior wall of the fuel tank is generally treated to resist corrosion from the fuel. Welding or otherwise fastening the strap to the fuel tank may damage the coating. Additionally, the direct contact of the metal strap to the metal fuel tank wall may lead to a cathodic corrosion of either the strap or tank. It is desirable to provide a method of securing the reservoir within the fuel tank wall without using metal straps.

A number of fuel tanks teach the use of a plastic or rubber bladders within a metal fuel tank. U.S. Pat. No. 4,852,765 teaches a bladder for a fuel tank to separate the tank interior into a variable volume fuel space and air space. Bladders of this type are not used as fuel reservoirs and do not concentrate the remaining fuel within the tank for delivery to an engine. Bladders generally form fluid-tight enclosures to prevent fuel from contacting the fuel tank outer wall. Bladders generally reduce the overall volume of space available for containing fuel and increase the complexity of manufacturing a fuel tank assembly.

It is an object of the present invention to provide a reservoir secured within a fuel tank without the need of mechanical fasteners. It is another object of the invention to provide a reservoir which does not scratch, abrade, or damage the treated fuel tank surface. It is a further object of this invention to provide a low-cost method of manufacturing a fuel tank assembly.

SUMMARY OF THE INVENTION

The present invention provides fuel tank assembly which comprises a first and second fuel tank walls spaced apart a distance. A reservoir having a free-state dimension slightly greater than the distance between the first and second walls is compressed therebetween. A resilient portion of the reservoir is made by forming the reservoir wall in a pleated shape.

The reservoir is primarily intended to be used within a metal fuel tank. Metal fuel tanks generally comprise two clam-shaped halves welded together. A positioning means is formed in one or both halves. The positioning means may comprise either a raised or recessed surface which registers with the reservoir and acts to both align and retain the reservoir in position. When using steel for the fuel tank walls, these positioning means are generally stamped as part of the fuel tank shape.

A completed fuel tank is assembled by placing the reservoir in one of the fuel tank halves. The reservoir has a free-state dimension slightly greater than the space between the fuel tank halves. The other half is placed atop the reservoir and a force applied thereto. The reservoir is slightly compressed between the tank halves. The perimeter of the tank halves is joined together and sealed by welding, brazing, adhering, or other means. The reservoir remains biased between the tank halves.

The fuel tank reservoir may be made with either bowed, pleated, or linear wall surfaces which are resilient and compressible. Especially preferred is a resilient portion having a pleated section to both compress between the fuel tank halves and compensate for slight misalignment of the reservoir within the fuel tank. The reservoir may be made in one or more pieces. The resilient portion of the reservoir is preferably made from a material having good compression and rebound characteristics, resistance to degradation in a fuel environment, and is easily manufacturable. Preferred materials include polyethylene, polypropylene, nylon, ABS, and other thermoplastics.

The present invention provides an easily manufacturable and low-cost fuel reservoir retained within a fuel tank without the need for mechanical fasteners. The reservoir is not bonded to the interior surface of the fuel tank. The reservoir is securely retained in position through contact with both halves of the fuel tank. These and other objects, features, and advantages of the present invention will be more clearly understood upon reference to the drawings and accompanying specification.

BRIEF DESCRIPTION OF THE DRAWINGS

FIG. 3 is the fuel tank assembly shown in FIG. 2 illustrating the reservoir being compressed by the fuel tank walls.

FIG. 4 is an exploded perspective view of the fuel tank assembly shown in FIG. 2.

DETAILED DESCRIPTION OF THE PREFERRED EMBODIMENTS

Figure 1:
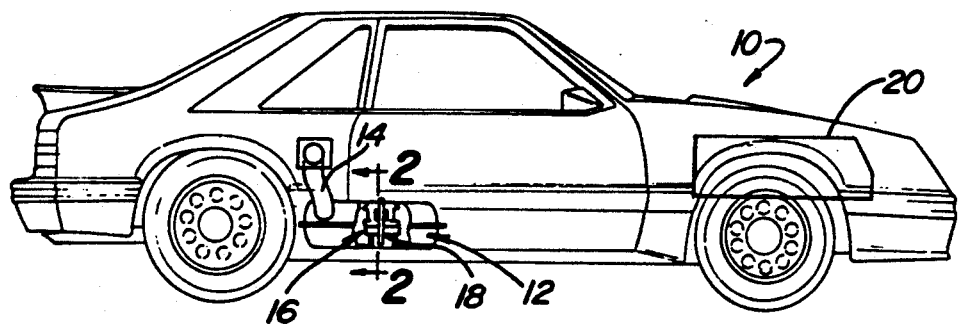
FIG. 1 is a side view of an automobile having a fuel tank assembly incorporating the present invention.

The present invention may be used within any type of container, but is primarily intended for use in automotive fuel tanks. FIG. 1 illustrates vehicle 10 having a fuel tank 12 positioned generally horizontally and forward of the rear wheels. Fuel filler tube 14 supplies fuel to tank 12. Within tank 12 is reservoir 16 and fuel delivery module 18. Fuel delivery module 18 generally comprises an in-tank fuel pump, fuel level sensor, and fuel float assembly inserted through opening in the fuel tank. The fuel delivery module supplies fuel to engine 20.

Figure 2:
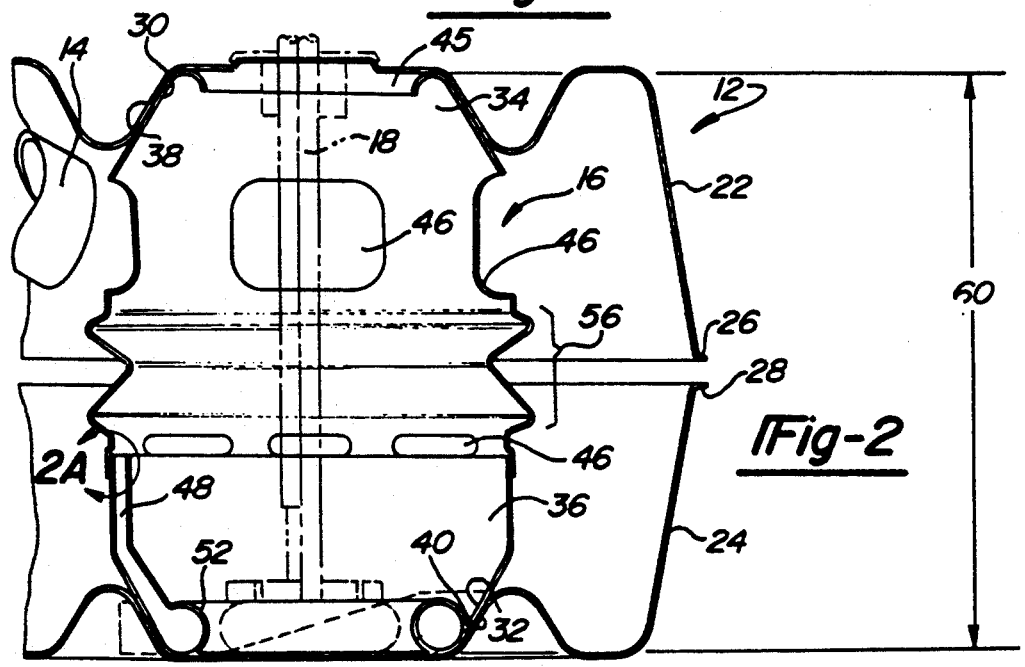
FIG. 2 is a cross-sectional view along the line 2—2 in FIG. 1 illustrating the fuel tank and reservoir prior to assembly.

Illustrated in FIGS. 2-4 is a construction of a preferred embodiment of the fuel reservoir and fuel tank. Fuel tank 12 comprises upper and lower halves 22, 24. The fuel tank and reservoir of the present invention will be illustrated using a substantially horizontal fuel tank. Vertically oriented fuel tanks having left and right tank halves are also within the scope of the present invention. Halves 22, 24 are generally concave and enclose a quantity of fluid when assembled. Flange 26 on upper half 22 mates with flange 28 on lower half 24. Fuel filler tube 14 passes through upper half 22 and supplies fuel to fuel tank 12. Positioning surfaces 30, 32 are embossed on halves 22, 24, respectively. Positioning surfaces 30, 32 are generally formed by stamping. Alternatively, separate brackets may be affixed to the interior surface of halves 22, 24.

Reservoir 16 is placed between halves 22, 24 and is retained in proper position by surfaces 30, 32. Reservoir 16 may be made in one or more pieces. Illustrated in FIGS. 2-4 is a two-piece reservoir assembled from upper portion 34 and lower portion 36. Portion 34 has a mating surface 38 which registers with positioning surface 30. Lower portion 36 has a mating surface 40 which registers with positioning surface 32.

Figure 2A:
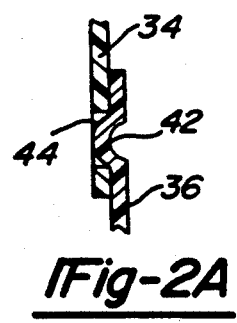
FIG. 2a is a detailed cross-sectional view of the area marked FIG. 2a in FIG. 2.

Reservoir 16 is assembled by placing portion 34 over portion 36. As shown in FIG. 2a, tab 42 on portion 36 engages slot 44 on portion 34. Opening 45 in upper half 22 and upper portion 34 receives fuel pump assembly 18. Openings 46 admit fuel into the internal region of reservoir 18. Labyrinth 48 acts to concentrate the fuel remaining within tank 12 within reservoir 18 as the vehicle is undergoing a change in direction or speed. Labyrinth 48 comprises opening 50 (shown in FIG. 4) located at the lowest portion within fuel tank 12 and communicating with the area outside of receiver 16. Opening 52 (as shown in FIG. 2) communicates with the interior of reservoir 16. Opening 54 vents labyrinth 48. Labyrinth 48 may be made integrally with reservoir 16. Alternatively, labyrinth 48 may be made from a separate piece and secured to reservoir 16.

Reservoir 16 contains a resilient portion 56. Resilient portion 56 is compressible and tends to rebound from its compressed state. Illustrated in FIGS. 2-4 is resilient portion 56 made from a pleated or fan fold section in upper portion 34. Resilient portion 56 comprises two sinusoidal-shaped pleated folds although other configurations are possible. Specifically included are bowed sections which do not contain pleats and columnar sections which compress linearly. Other configurations which include convolutions and coils are capable of providing resilient biasing and are included within the scope of this invention.

Fuel tank assembly 12 is manufactured by assembling upper and lower portions 34, 36. Upper and lower tank halves 22, 24 are stamped or machined into the desired configuration. Reservoir 16 is placed within lower half 24. Positioning surface 32 forms a generally C-shaped, upstanding projection in lower half 24 as shown in FIG. 4. Entrance 58 in positioning surface 32 receives labyrinth 48. Mating surface 40, together with labyrinth 48, align and position reservoir 16 in a predetermined orientation within lower half 24. In an automated assembly environment, reservoir 16 may be manually or robotically placed within lower half 24. Positioning surface 32 and mating surface 40 cooperate to correct a slight misalignment of reservoir 16. Upper half 22 is placed atop reservoir-16 and lower half 24. Mating surfaces 38 engage positioning surfaces 30 as shown in FIG. 2. Reservoir 16 has a free-state dimension 60. Upper and lower halves 22, 24 are spaced apart a distance 62 when the fuel tank is finally assembled as shown in FIG. 3. Dimension 60 is slightly greater than distance 62. This difference is the amount of compression in reservoir 16 after assembly.

Upper and lower halves 22, 24 are urged together and sealed. For steel fuel tanks, generally flanges 26, 28 are joined and sealed by welding. Resilient portion 56 accommodates some axial misalignment of upper and lower halves 22, 24. The fuel tank is completed by attaching the fuel filler tube 14 and insertion of fuel pump assembly 18.

Reservoir 16 generally provides no sealing surfaces, either against the interior of the fuel tank or about the perimeter of fuel tank assembly 18. Fuel enters the interior portion of reservoir 16 through openings 46 and labyrinth 48. When fuel tank 12 is filled or under pressure, distance 62 may increase due to a bowing of upper and lower halves 22, 24. It is intended that dimension 60 always be greater than the distance 62 to ensure resilient biasing of reservoir 16 against upper and lower halves 22, 24. Reservoir 16 is retained in position within fuel tank 12 without the need of mechanical fasteners. The interior of fuel tank 12 is protected from damage from the mechanical fasteners or from the movement of reservoir 16. Reservoir 16 is securely held in position by both upper and lower halves 22, 24 to eliminate potential for rattles or movement.

Reservoir 16 may be made from a metal, plastic, or rubber material. Most preferred is a fuel resistant plastic material having good resilient properties which tend to return the plastic to its free-state dimensions after compression. Such materials include polyethylene, polypropylene, and nylon. The reservoir may be manufactured in one or more pieces. Most preferred is the manufacture of a two-piece reservoir which may be easily assembled prior to insertion within the fuel tank. The two-piece design permits the pieces to be separately molded and stacked, one within the other, to simplify storage and transportation. Assembly may be performed without the need of tools or additional fasteners.

Figure 6:
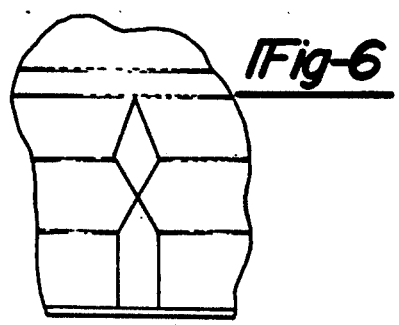
FIG. 6 is a detailed view of the alternative embodiment shown in FIG. 5 taken in a direction of arrows 6.
Figure 5:
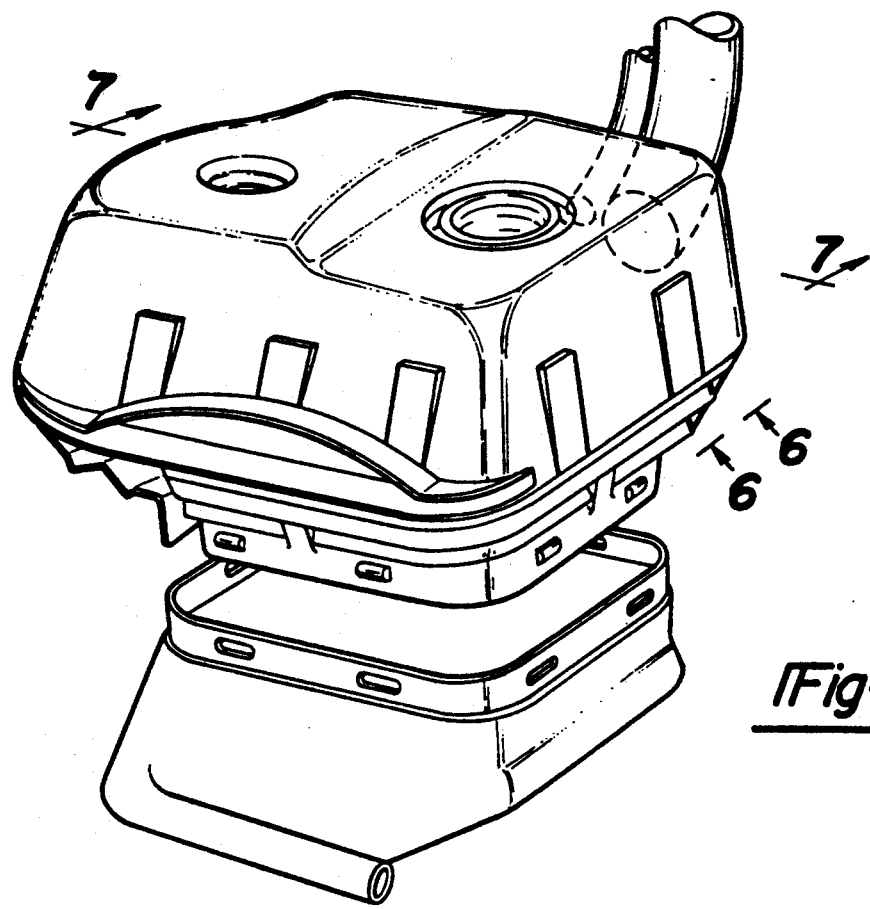
FIG. 5 is an exploded perspective view in partial cross-section of an alternative embodiment of the reservoir.
Figure 7:
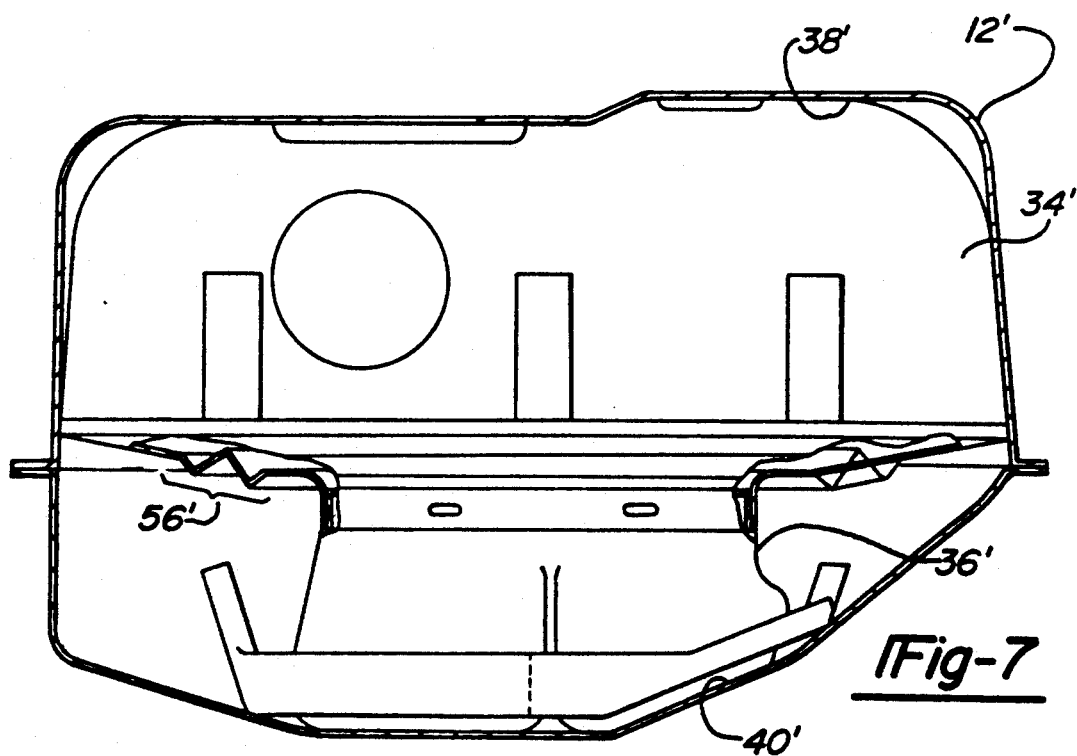
FIG. 7 is a partial cross-sectional view of an alternative embodiment shown in FIG. 5 installed within a fuel tank.

FIGS. 5-7 illustrate an alternative embodiment of the present invention for use in existing fuel tanks. A existing fuel tank may not include positioning surfaces for aligning and retaining the reservoir. In this circumstance, reservoir 16' is shaped to mate with the interior surface of fuel tank 12'. Mating surfaces 38', 40' on reservoir 16' mate with the interior surface of fuel tank 12'. Resilient portion 56' is placed generally horizontally within the tank and compresses when reservoir 16' is assembled within fuel tank 12'. Axial misalignment of reservoir 16' within fuel tank 12' may be accommodated within the folds of resilient portion 56'. The shape of upper and lower portions 34', 36' prevents reservoir 16' from being improperly seated within tank 12'. To further provide resilient biasing within resilient portion 56', diamond-shaped folds 64 (as shown in FIG. 6) are formed within the pleats of resilient portion 56'. Folds 64 ensure a more uniform compression of resilient portion 56'.

In the alternative embodiment of the invention illustrated in FIG. 5, fuel filler tube 14' extends within reservoir 16'. Connecting fuel filler tube 14' directly within reservoir 16' permits an engine restart after fuel run-out with a small quantity of fuel. All the fuel that is added to fuel tank 12' is supplied directly to reservoir 16'.

Reservoir 16' is also made of two pieces assembled together using a tab and slot arrangement. The pieces may be made by injection molding or blow-molding to conform to the shape of existing fuel tank 12'.

The invention has been described by reference to its preferred embodiments. Modifications or changes to the preferred embodiments may be made without departing from the spirit and scope of the claimed invention. The preferred embodiments together with such changes and modifications are intended to be included within the scope of the appended claims.

I claim:

1. A fuel tank assembly comprising:
   first and second fuel tank walls being spaced apart a distance; and
   a reservoir between said walls having a free-state dimension slightly greater than said distance where said reservoir is compressed between said walls, said reservoir defining openings communicating fuel between said fuel tank walls and the interior of said reservoir.

2. The fuel tank assembly of claim 1, said reservoir further comprising a resilient portion compressible between said first and second walls.

3. The fuel tank assembly of claim 2, wherein said resilient portion is pleated.

4. A fuel tank assembly comprising:
   a first fuel tank wall having a first concave interior surface and a second fuel tank wall having a second concave interior surface spaced apart a distance; and
   a reservoir compressibly secured between said first and second walls, said reservoir having a first surface matingly engaging said first interior surface and a second surface matingly engaging second interior surface, said first and second surfaces of said reservoir having a free-state dimension greater than said distance, said reservoir defining opening communicating fuel between said fuel tank walls and the interior of said reservoir.

5. The fuel tank assembly of claim 4, said reservoir further comprising a compressed resilient portion which biases said first and second surfaces of said reservoir against said first and second interior surfaces of said fuel tank wall.

6. The fuel tank assembly of claim 5, wherein said resilient portion is pleated.

7. The fuel tank assembly of claim 4, wherein said reservoir is made from two or more pieces.

8. The fuel tank of claim 4, wherein said fuel tank walls are made of metal and said reservoir is made of plastic.

9. The fuel tank of claim 4, further comprising means aligning said reservoir between said first and second fuel tank walls.

10. The fuel tank of claim 9, wherein said aligning means are portions on at least said first interior wall surface which engages a corresponding portion on said first wall of said reservoir and orients said reservoir in a predetermined direction.

11. The fuel tank reservoir of claim 4, said first interior surface of said fuel tank wall defining at least a first aperture and said first surface of said reservoir defining at least a second aperture aligned with said first aperture and receiving a member therethrough.

12. The fuel tank assembly of claim 11, wherein said member is a fuel pump assembly.

13. The fuel tank assembly of claim 11, wherein said member is a fuel filler tube.

14. A method of manufacturing a fuel tank assembly comprising the steps of:
    providing a fuel tank having first and second walls being spaced apart a distance;
    placing a reservoir between said first and second walls having a free state dimension slightly greater than said distance, said reservoir further include openings to communicate fuel between said walls and interior of said reservoir,
    urging said first and second walls together and compressing said reservoir; and
    securing said first and second walls together.

15. The method of claim 14, wherein said reservoir is resiliently biased against said first and second walls.

* * * * *